UNITED STATES PATENT OFFICE.

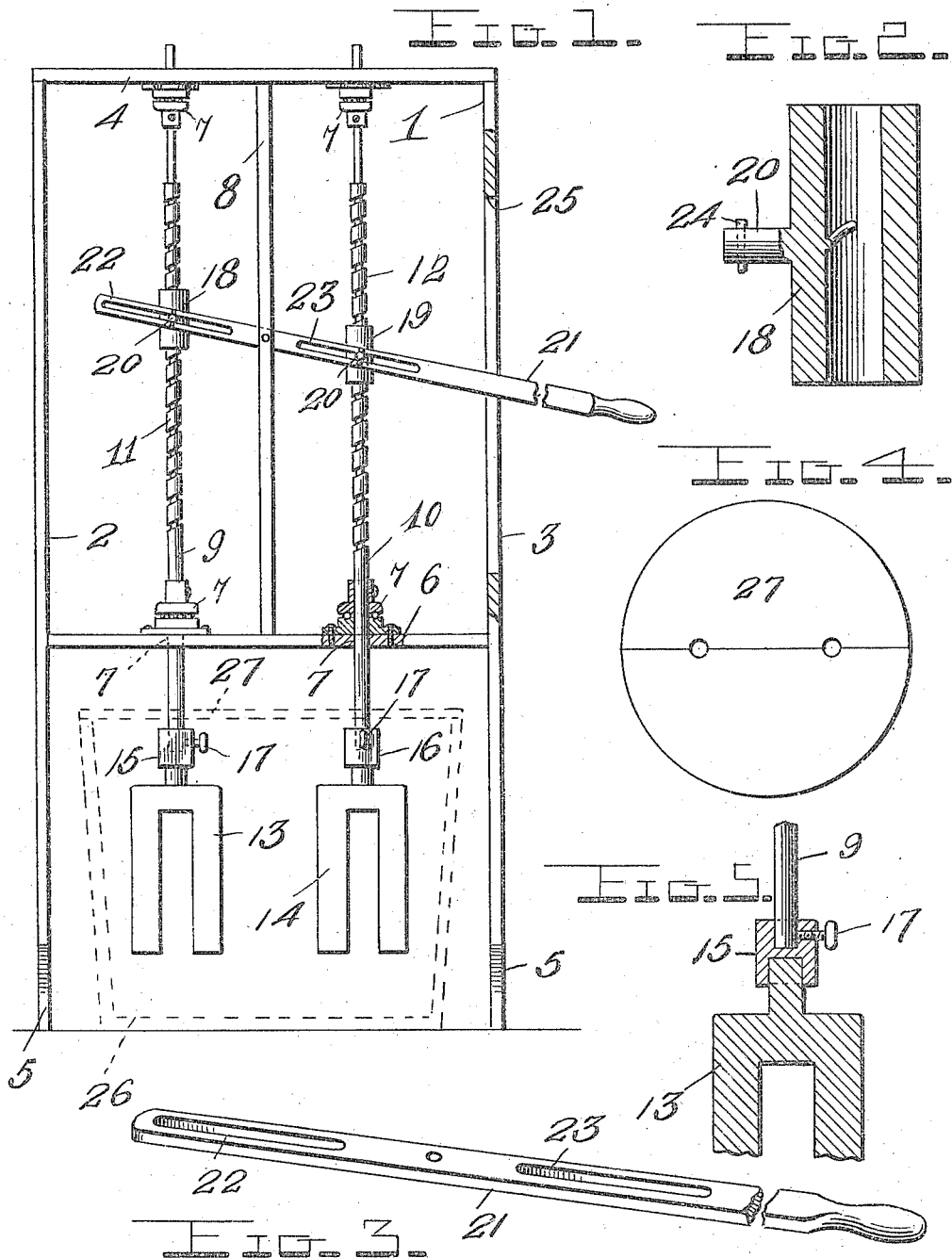

PRESTON B. SOUTHWORTH, OF KLAMATH FALLS, OREGON, ASSIGNOR OF ONE-HALF TO FLOYD ZIM BALDWIN, OF KLAMATH FALLS, OREGON.

CHURN.

951,462.  Specification of Letters Patent.  Patented Mar. 8, 1910.

Application filed April 12, 1909. Serial No. 489,450.

*To all whom it may concern:*

Be it known that I, PRESTON B. SOUTH-WORTH, a citizen of the United States, residing at Klamath Falls, in the county of Klamath and State of Oregon, have invented certain new and useful Improvements in Churns; and I do declare the following to be a full, clear, and exact description of the invention, such as will enable others skilled in the art to which it appertains to make and use the same.

This invention relates to an improvement in churns especially to the dasher or paddle operating mechanism.

The object of the invention is to provide simple and efficient means for whirling a paddle at a rapid rate causing it to move in opposite directions on the alternate strokes of the operating handle.

With this and other objects in view, the invention consists of certain novel features of construction, combination and arrangement of parts as will be more fully described and particularly pointed out in the appended claim.

In the accompanying drawings: Figure 1 represents a front elevation of this improved churn with a cream or milk receptacle shown in dotted lines; Fig. 2 is a detail sectional view of the sliding bur; Fig. 3 is a perspective view of the operating handle detached; Fig. 4 is a top plan view of the cover or lid for the cream receptacle; and, Fig. 5 is a detail sectional view of one of the dashers.

In the embodiment illustrated a supporting frame 1, is shown made of any suitable material preferably wood which is composed of two upright members 2, and 3, connected at their upper ends by a cross bar 4, and provided at their lower ends with supporting feet as 5. A partition 6, connects said uprights 2, and 3, intermediately of their ends and is provided with longitudinally spaced openings as 7, for a purpose to be described. A vertical partition 8, is arranged between the cross bar 4, and partition 6, and is connected thereto about mid-way the length thereof. Two shafts 9, and 10, extend through the apertures 7, in the transverse partition 6, and have their upper ends reduced and extended through the top cross bar 4. These shafts are provided with worms 11, and 12. The top cross bar 4, is provided on its inner or lower face with ball bearings arranged around apertures through which the worm shafts 9, and 10 extend and the partition 6, is also provided on its upper face with ball bearings arranged around apertures 7, to provide for the easy turning of said shafts 9, and 10. These ball bearings are constructed to prevent the worm shafts from moving up or down after they are once in position.

Detachably connected with the lower ends of the shafts 9, and 10, below the transverse partition 6, are two dashers or paddles 13, and 14, each provided with any desired number of blades. The upper ends of the dashers 13, and 14, are provided with castings 15, and 16, having angular sockets in their upper ends to receive the lower ends of the shafts 9, and 10, said ends being preferably shaped to fit within said sockets and they are detachably secured therein by means of set screws as 17. Arranged on each of the worm shafts 9, and 10, are two babbitted burs 18, and 19 each of which is provided with a laterally extending lug as 20. These burs are adapted to move up and down on the worms 11, and 12, of said shaft to impart a whirling motion thereto. An operating handle 21, is pivotally mounted on the partition 8, to swing in a vertical plane. This lever is preferably provided with two longitudinally extending slots 22, and 23, which are designed to fit over the lugs as 20, on the burs and which are held in position thereon by a pin 24, or any other suitable means. The outer end of this lever 21, preferably projects through a longitudinally arranged slot 25, formed in one of the uprights of the supporting frame and which serves as a guide for said lever. A milk or cream receptacle 26, is disposed in the lower part of the supporting frame in position to receive the dashers 13, and 14, and is held in position by any suitable means. This receptacle 26, is preferably provided with a cover 27, preferably formed of two separable members having spaced semi-circular openings arranged at the inner edge of each member, those in one member being designed to register with those in the other when the two members are assembled to provide openings for the passage of the shafts 9, and 10. These lid members may be secured together and to the receptacle 26, by any suitable means.

In the operation of this improved churn the operating lever 21, is raised and lowered like a pump handle, one bur going up on one worm shaft while the other bur goes down on the other shaft thereby causing the dashers or paddles 13, and 14, to whirl in opposite directions at all times. The worms on each shaft are made exactly the same and are preferably about 8 inches long more or less. The dogs formed on the insides of the burs follow the grooves in the shafts with up or down motion which causes the paddles to stop and turn in an opposite direction at the end of each stroke. The paddles will preferably make five or six revolutions as the bur moves down the worm of its respective shaft and the same number of revolutions as it passes up on said shaft. It will thus be evident that a simple moving up and down of the lever 21, produces a very rapid whirling of the dashers in opposite directions whereby the contents of the receptacle 26, are thoroughly agitated and which renders the device especially adapted for churning sweet or sour cream and to separate and churn new milk after it has been cooled to 62 degrees.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention:

In a churn, a supporting frame, comprising vertical side pieces and a top cross piece, one of the side pieces provided with a longitudinal slot, a horizontal partition extending between and connecting the side pieces at points intermediate the ends of the side pieces, a vertical partition arranged centrally of the width of the supporting frame and between the horizontal partition and top piece, a pair of vertically disposed worm shafts revolubly mounted in and extending through the top piece and horizontal partition of the frame, burs engaging the threads of the worm shafts and provided with lateral extending studs, an operating lever extending through the slot of the supporting frame and the vertical partition, said lever pivoted on the partition and provided with longitudinal slots at opposite sides thereof to operatively engage the studs of the burs and dashers connected with the lower ends of the worm shafts.

In testimony whereof I have hereunto set my hand in presence of two subscribing witnesses.

PRESTON B. SOUTHWORTH.

Witnesses:
G. W. WHITE,
W. O. DELZELL.